United States Patent [19]

Stewart

[11] 4,053,064
[45] Oct. 11, 1977

[54] HAY BALE COLLECTOR

[76] Inventor: Garth David Stewart, Nightingale St., Wyndham, New Zealand

[21] Appl. No.: 692,426

[22] Filed: June 3, 1976

[30] Foreign Application Priority Data

June 4, 1975 New Zealand .................. 177703

[51] Int. Cl.² .............. A01D 87/12; B65G 57/32
[52] U.S. Cl. ............................... 214/6 B; 56/475
[58] Field of Search ............ 214/6 B, 144, 350, 352; 56/473.5, 474, 475; 193/40, 35 C

[56] References Cited

U.S. PATENT DOCUMENTS

| | | | |
|---|---|---|---|
| 2,736,159 | 2/1956 | Marshall | 56/475 |
| 3,308,971 | 3/1967 | Sinden et al. | 214/6 B |
| 3,499,550 | 3/1970 | Jensen | 214/6 B |
| 3,779,402 | 12/1973 | Erlenbusch et al. | 214/6 B |
| 3,924,757 | 12/1975 | Meyer | 56/475 X |

FOREIGN PATENT DOCUMENTS

| | | | |
|---|---|---|---|
| 163,585 | 6/1955 | Australia | 56/473.5 |
| 242,344 | 7/1960 | Australia | 214/6 B |

*Primary Examiner*—L. J. Paperner
*Attorney, Agent, or Firm*—Holman & Stern

[57] ABSTRACT

A hay bale collector arranged to accumulate a number of bales in a regular pattern by diverting bales alternatively into two compartments until both compartments have been filled with the required number of bales and then releasing the bales together in a group from the filled compartments.

6 Claims, 5 Drawing Figures

HAY BALE COLLECTOR

BACKGROUND OF THE INVENTION

This invention relates to a hay bale collector. There are many designs of hay bale collectors, each being arranged to collect a predetermined number of hay bales in a regular pattern and when the required bales have been collected to release them in a group ready for easy collection, for exampe by some mechanical lifting device. In many hay bale collectors in which two adjacent compartments are filled with bales it is desirable for the compartments to be filled evenly and it is important that the means directing the bales into the compartments operate when the machine is turning or traveling on ground that is comparatively rough.

SUMMARY OF THE INVENTION

It is therefore an object of the present invention to provide a hay bale collector which will go some way to achieving the above mentioned desiderata or will at least provide a useful choice over other hay bale collectors at present available.

Accordingly the invention consists in a hay bale collector comprising a hay bale confining frame defining two adjacent bale holder compartments, means to allow the frame to be moved to present bales in a position to move in the bale holding compartments, bale directing means to direct the bales so presented into alternate compartments until both compartments are full and release means to release together as a group the bales from both filled compartments.

BRIEF DESCRIPTION OF THE DRAWINGS

One preferred form of the invention will now be described with reference to the accompanying drawings in which.

DETAILED DESCRIPTION OF THE PREFERRED EMBODIMENT

Figure 3:
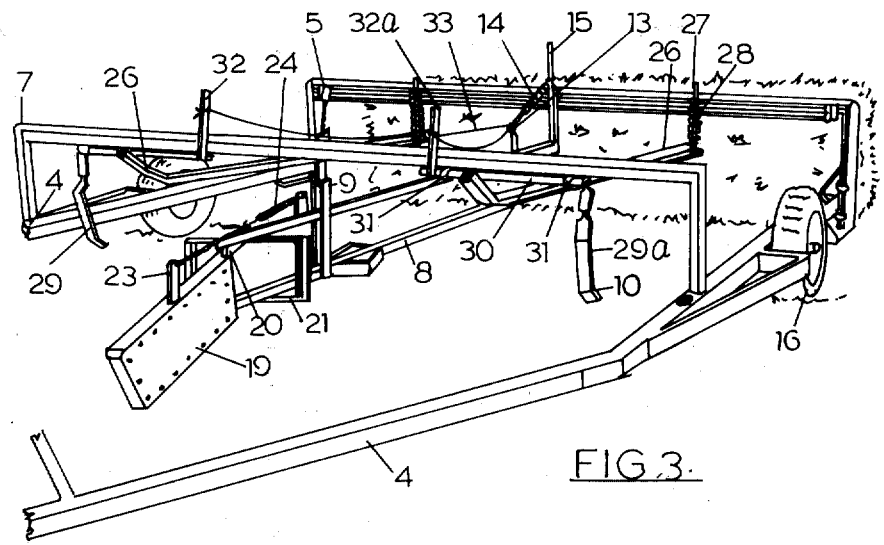
FIG. 3 is a more detailed pictorial view from the front showing the hay bale collector releasing a charge of bales.
Figure 2:
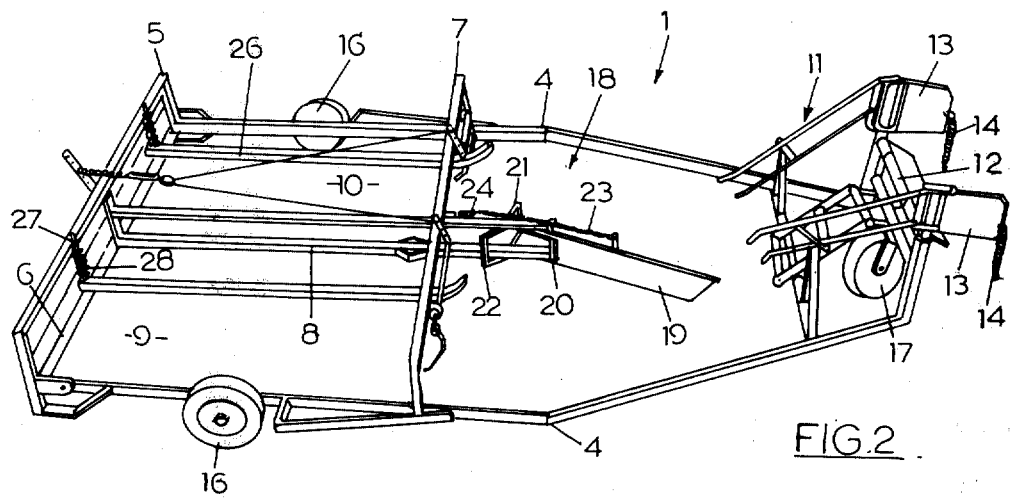
FIG. 2 is a pictorial view of the hay bale collector according to the present invention.

The hay bale collector 1 in the preferred form is designed to be connected and towed behind a hay baler 2 which in turn is towed by a tractor 3. However while this is the preferred form of the invention it should be appreciated that the present invention may be applied to a hay bale collector designed to be towed independently of a hay baler with a conventional bale aligning arrangement essentially provided in front of the mechanism as illustrated in FIG. 3 of the drawings.

The bale collector 1 is formed having a bale defining frame made up by side frames 4, a rear frame 5 supporting a release gate 6 and a bridge frame 7 connecting together the side frames and providing a support for the other components as will be described later.

A central division 8 extends from the rear frame forwardly of the bridge frame 7 and in combination with the rear gate and part of the side frames defines two equal bale holding compartments 9 and 10.

Figure 1:
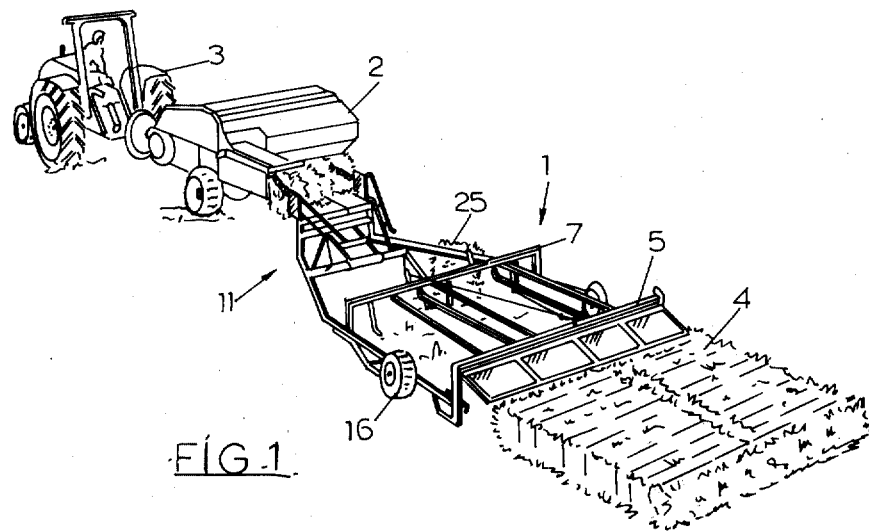
FIG. 1 is a general pictorial view showing the hay bale collector according to the present invention in use behind a tractor drawn hay baler.

The front of the collector has means to allow connection to the rear of the hay baler 2 as illustrated in FIG. 1. A low friction guide chute 11 has a series of rollers 12 running the bales that have been discharged from the baler down to engage with the ground in the correct position to strike the hay bale deflector as will be described later. Two flaps 13 with springs 14 ensure that the bales are guided on to the chute even when the hay baler 2 is turning relative to the collector. Side frames 15 ensure that the bales are presented substantially longitudinally to the longitudinal axis of the collector.

The collector 1 is supported on two side wheels 16 and one front jockey wheel 17.

A bale deflecting means 18 is provided to deflect the bales presented from the guide chute 11 alternatively into the compartments 9 and 10 until both compartments are filled. The bale deflector means 18 comprises a deflector gate 19 mounted on a vertical pivot 20 and projecting forwardly from the forward end of the division 8. An open frame extends rearwardly beyond the pivot 20 and is attached to abutment wings 21 and 22 projecting on either side of the longitudinal axis drawn through the deflector gate and pivot point. The outer upright in the deflector wings 21 and 22 engages with a structural member in the central division 8 thereby operating as a stop to locate the diverter gate 19 in a first position directing bales into the compartment 10, or a second position representing a mirror image of the first position directing bales into the compartment 9.

A biassing force is exerted to hold the deflector gate in one of the positions. This is provided by a flexible connector 23 and biassing spring 24 extending from a point on the top of the deflector gate in advance of the pivot 20 to a position on the central division rearward of the abutment wings 21 and 22.

In use bales directed down the chute 11 hit the ground and almost immediately come into engagement with the deflector gate 19. The relative movement between the ground and the bale collector including the deflector gate causes the bale to turn sideways and move into the compartment 10. A bale 25 being so turned ready for positioning into one compartment is shown in FIG. 1. As the bale moves past the deflecting means, it contacts the projecting wing 21 and exerts a force thereupon tending to move the deflector gate towards the second position. The movement is sufficient to cause the deflector gate to move past a position where the gate will be influenced by the biassing spring 24 and flexible connection 23 to assume the second of the two stable positions ready to deflect a bale into the compartment 9. This process is repeated until both compartments 9 and 10 have been filled.

The present invention is designed to work with an open frame allowing the bales to come into ground contact so that the bales are actually drawn across the ground prior to release. However, the invention would operate if a movable surface was provided to generate the same relative movement between the bales and the deflector means as at present is provided by movement over the ground. This for example could be provided by some endless conveyor belt support but would obviously introduce complexity and considerable additional cost to the apparatus.

With the preferred form of the invention and the bales being designed to be drawn over the ground the friction between the bales and the ground tends to generate a force which particularly in uneven ground may cause the bales to turn onto their side if not restrained. To this end, a centrally located restraining bar 26 is provided in each compartment. The bar is supported at the front end from the bridge frame 7 and at the rear end through an upstand 27 in a guide associated with the rear frame 5 to allow vertical movement. This vertical movement is against a biassing spring 28 which exerts the restraining force on the top of the bales.

As mentioned above, the hay bale accumulator according to the present invention includes a release means in the form of the openable gate 6 at the rear of the compartments 9 and 10 to allow the accumulated bales when the compartments are filled to be released together in a group, the bales being so released are illustrated in FIG. 1.

Figure 4:
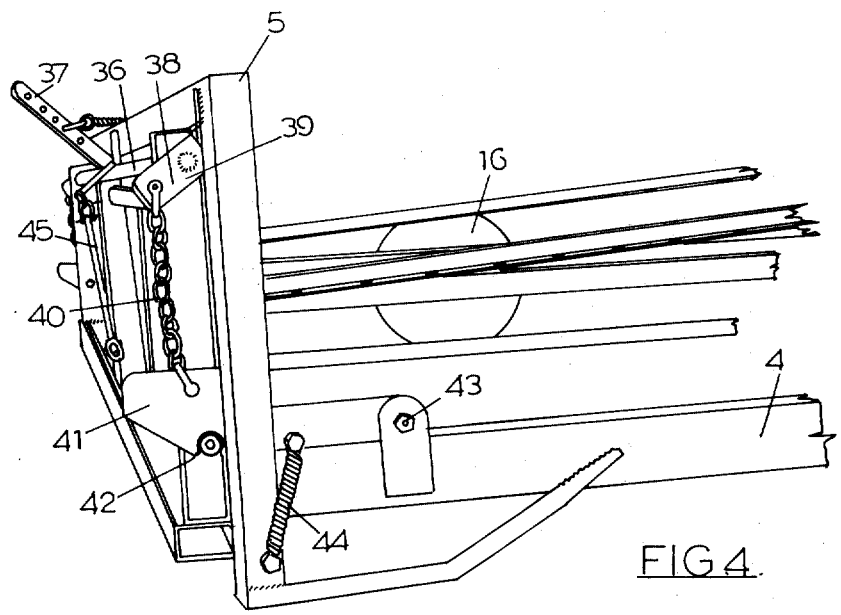
FIG. 4 is a rear side detailed view showing the release gate catch and trip mechanism and FIG. 5 is a detailed view showing the front of the release gate.
Figure 5:
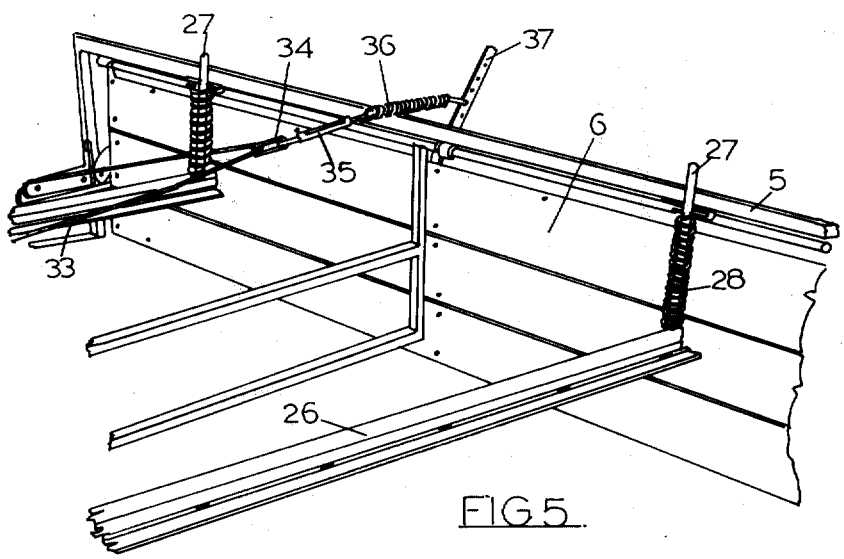

Such a release means could be provided for example by a manual trip operated by the tractor driver. However, it is cleary desirable to include some form of automatic gate opening means which will operate when the compartments 9 and 10 are filled and which will be reliable in the range of operated conditions likely to be experienced by the collector. To this end a pivotal sensing arm 29 is associated with the compartment 9 and a similar sensing arm 29a is associated with the compartment 10. The sensing arms are each mounted on a rotatable shaft 30 held in suitable bearing supports 31 but with the sensor arranged so that it may rotate without turning the shaft 30 should it ever be necessary to back the collector off a load of collected hay bales. However if a bale moves past the sensing arm 29, movement by the bale rearwardly relative to the sensing arm will cause the shaft 30 to rotate thereby causing a lever 32 or 32a to move. The levers 32 and 32a are connected by a cable 33 which in turn passes about a pulley 34 and is connected via an adjustable turn buckle 35 and biassing spring 36 to a lever 37 (see FIG. 5). This provides a mechanical summation means between the sensing arm 29 and 29a so that when both compartments 9 and 10 are filled an increased force is transmitted to the lever 37 to open the rear gate 6. Details of the tripping mechanism will be apparent with reference to FIG. 4. The lever 37 rotates a shaft 38 which lifts arms 39 connected via a chain 40 to a catch 41 engaging over a pin 42 projecting from the side of the gate 6 thereby holding the gate 6 closed. The catch 41 is pivotally mounted on a support 43 and is biassed to a closed position by a biassing spring 44. The shaft 38, hence the lever 37 is also biassed to the inoperative position by a biassing spring 45.

Thus in use upon both compartments being filled a force is transmitted through the cable 33 and biassing or damping spring 36 to the lever 37. This exerts a force sufficient to lift the arms 39 and raise the catch 41 free of the pin 42 thereby allowing the gate under the combined weight of the bales to swing upwardly allowing the bales of discharge as shown in FIG. 1. As soon as the gate 6 is free from the bales it will close and the catch 41 will again engage with the pins 42 locking the gate closed. This action will take place before the bale 25 as illustrated in FIG. 1 reaches the rear of the compartment 9 into which it is being directed.

What I claim is:

1. A hay bale collector comprising a bale confining frame, ground support means to support said frame for movement over the ground, towing means to allow the frame to be towed over the ground, a rear frame and release gate across the rear of said bale confining frame, a central division in combination with said bale confining frame, defining two adjacent open front bale holding compartments, bale diverting means projecting from the forward end of said central division to divert bales coming into engagement therewith alternatively into one compartment and then the other compartment until both compartments are full, a compression bar longitudinally located in each bale holding compartment to exert a downward force on said bale, said compression bar being centrally located with an upwardly directed forward end and a rearward end adjacent the back of the bale compartment guidable to be lifted against the action of a biassing means to exert a downward pressure on top of the bales in said compartment and opening means to open said release gate, releasing together in a group the bales from the filled compartments.

2. The bale collector as claimed in claim 1 wherein the bale confining frame at the front end is arranged to be towed behind a hay baler and receive bales directly from the hay baler with the front of said frame including a low friction guiding chute to direct the bale from said baler substantially longitudinal so that a front corner of said bale will contact said bale diverting means.

3. The bale collector as claimed in claim 1 wherein the relative movement between the bale and the bale holding compartment is caused by allowing the bale to contact the ground causing the bale holding compartment to move relative thereto.

4. The bale collector as claimed in claim 1 wherein said bale diverting means comprises a diverter gate, a vertical pivotal mounting for said diverter gate at the forward end of said central division separating said bale holding compartments, abutment wings connected to said diverter gate and projecting on either side of the longitudinal axis of said diverter gate rearwardly of said pivot point so that one abutment wing will be struck by a diverted bale and transmit a force changing the position of said diverter gate, stop means to locate said diverter gate in a first position directing bales into one compartment and a second position directing bales to the other compartment and biassing means operable to hold said diverter gate in either of said first or second positions.

5. The bale collector as claimed in claim 1 wherein said opening means comprises a first sensing means associated with one bale compartment and a second sensing means associated with the other bale compartment, mechanical summation means associated with both sensing means and trip means operable through said summation means whereby the trip means will be activated upon both sensing means assuming the operated position when the bale compartments are full and thus both acting together through said summation means upon said trip means.

6. The bale collector as claimed in claim 5 wherein said sensing means each comprise a pivotal arm arranged to be contacted by the bale moving past the arm into the first or second bale holding compartment, and said summation means comprise a mechanical connection between said pivotal arm so that when both arms are in contact with the bale, that is when both compartments are filled, an increased force is exerted to release said tripping means with a damper being provided between the summation means and the trip means.

* * * * *